Nov. 6, 1945. E. WILDHABER 2,388,456
FACE CLUTCHES
Filed Oct. 29, 1942  2 Sheets-Sheet 1

Inventor
ERNEST WILDHABER
By
Attorney

Nov. 6, 1945.  E. WILDHABER  2,388,456
FACE CLUTCHES
Filed Oct. 29, 1942  2 Sheets-Sheet 2

Inventor
ERNEST WILDHABER
By
[signature]
Attorney

Patented Nov. 6, 1945

2,388,456

UNITED STATES PATENT OFFICE 2,388,456

FACE CLUTCH

Ernest Wildhaber, Brighton, N. Y., assignor to Gleason Works, Rochester, N. Y., a corporation of New York Application October 29, 1942, Serial No. 463,772

27 Claims. (Cl. 192—67)

The present invention relates to toothed clutches and more particularly to clutches of the type for maintaining driving connection between two parts in axial misalignment. Clutches of this type have to a limited degree the function of a universal joint.

One object of the invention is to provide a toothed face clutch which will be capable of standing more misalignment of the axes of the parts connected by the clutch and still transmitting proper motion between said parts than any toothed clutch known.

Another object of the inveniton is to provide a clutch of the character described which will be of simple and compact structure and have high load-carrying capacity.

Further objects of the invention are to provide a semi-universal clutch which can be produced accurately at low cost by either cutting or grinding, and to provide simple, inexpensive methods of producing the members of such a clutch.

Still another object of the invention is to provide a semi-universal clutch which will operate smoothly at all angular positions within its range and which will permit of relative axial adjustment of one of the parts connected by the clutch with respect to the other part.

A still further object of the invention is to devise a semi-universal clutch in which one member will be capable of centering itself with respect to the other.

Another object of the invention is to provide a toothed face clutch of the character described in which the contacting tooth surface of the two engaging clutch members will contact with less than full length tooth bearing so that undue concentration of the loads at the ends of the clutch teeth may be avoided.

A still further object of the invention is to provide a process for cutting toothed face clutch members of the character described so that the two members of a clutch will be conjugate to each other and transmit correct motion.

Still another object of the invention is to provide a process whereby two tooth surfaces of each member of the clutch may be cut or ground simultaneously.

Still another object of the invention is to provide a method for cutting toothed face clutches of the character described with which full control of the length of bearing or tooth contact on both sides of the teeth of the engaging clutch members may be had.

Other objects of the present invention will be apparent hereinafter from the specification and from the recital of the appended claims.

In one embodiment of the present invention, the engaging clutch members are made with teeth that have longitudinally straight side surfaces that extend radially of the clutch axis. The teeth of one member have straight profiles that extend in the direction of the clutch axis, that is, that are of zero pressure angle. The other member has convex tooth profiles that are of zero pressure angle in the pitch plane of the clutch. The profiles of this member may be of any desired curvature but are preferably made of convex circular arcuate shape. Each side tooth surface of this member is preferably made a part of a convex conical surface whose axis lies in the pitch plane of the member, and is perpendicular to the axis of the member. Preferably opposite sides of spaced teeth of this member are made parts of the same convex conical surface. With this structure the two engaging clutch members can adjust readily relative to one another about the point of intersection of their two axes in the pitch plane so that they will properly transmit motion between the two parts which they connect in positions of axial misalignment of those parts.

The side tooth surfaces of the first clutch member can be produced with a suitable tool, as, for instance, a reciprocating planing tool by moving the tool across the face of the clutch blank in a path radial of the clutch axis and simultaneously feeding the tool depthwise into the blank until the tooth surfaces are cut to full depth. The side tooth surfaces of the other clutch member can also be cut with a suitable tool, as, for instance, a reciprocating planing tool by moving the tool across the face of the blank in a path radial of the clutch axis while feeding the tool depthwise into the blank until full tooth depth is reached, but in this case, the depthwise motion of the tool should be effected under control of a template so as to produce the required tooth profiles on the work.

In a further embodiment of the invention, the teeth of the engaging clutch members again extend generally radially of the clutch axis, but here the teeth have longitudinally curved sides which at mean points in their length are radial of the clutch axis. As in the first described embodiment of the invention, one member may have tooth sides of straight profile extending in the direction of the clutch axis, that is, of zero pressure angle, while the other member has tooth sides of convex profile, preferably convex circular arcs, which at the pitch surface are of zero pressure angle. Each member of the pair is preferably produced with a face mill cutter or annular grinding wheel which is of sufficiently large diameter to cut in two tooth zones of the work simultaneously and to cut opposite sides of spaced teeth of the work simultaneously. The member with the convexly curved tooth profiles will preferably have its sides finish-cut with the inside cutting edges of a spherical face-mill cutter, that is, a face-mill cutter having inside cutting edges of circular arcuate profile centered on the cutter axis. The cutter is rotated in engagement with a workpiece while being fed depthwise into the work. The other member may be cut with a face-mill cutter having outside finish-cutting edges of straight profile extending in the direction of the clutch axis, the cutter being rotated on its axis while being fed depthwise into the blank.

Thus in this second embodiment of the invention, one member of the clutch will have side tooth surfaces curved convexly both in the longitudinal and in the profile direction, and opposite sides of spaced teeth of this member will be parts of the same spherical surface. The other member will have tooth sides of concave lengthwise shape but straight profile, and opposite sides of spaced teeth of this member will be parts of a common cylindrical surface of revolution whose axis is parallel to the axis of the clutch member.

The tooth surfaces of the two members may be cut with cutters having finishing edges of zero pressure angle, in which case the axis of each cutter will be positioned parallel to the axis of the respective clutch member to be cut, or they may be cut with cutters of positive pressure angle, in which case the axis of each cutter will be inclined to the axis of the clutch member to be cut. The depthwise feed motion in either case is preferably in a direction inclined to the clutch axis.

With a clutch made according to this invention, it is possible to connect two rotary parts together by mounting one part in two spaced bearings and by mounting the other part at one end in a bearing and centering its opposite end through the engagement of its clutch portion with the clutch portion of the first named part. In other words, when two parts are connected together by a clutch constructed according to the present invention, there are three bearings and the clutch to hold the two parts in position.

Figure 5:
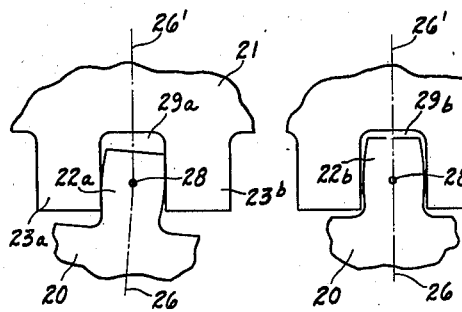
Fig. 5 is a view on an enlarged scale showing a tooth of a clutch member made according to this invention in engagement with a tooth space of the mating clutch member when the axes of the two members are in misalignment.
Figure 6:
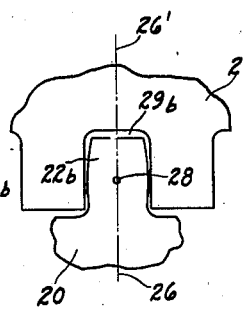
Figure 7:
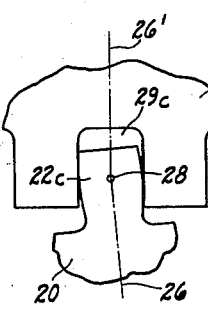
Figure 8:
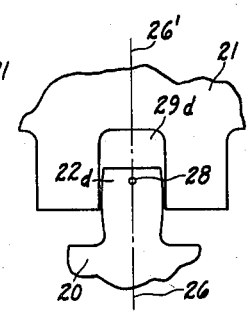
Figure 9:
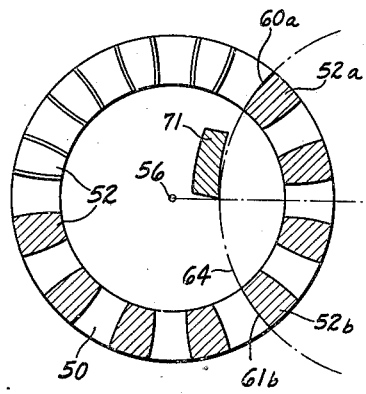
Figure 11:
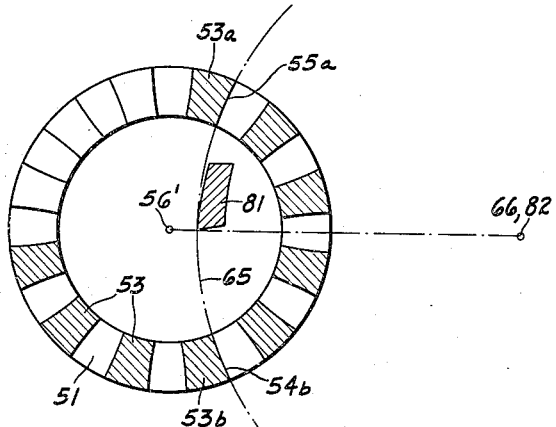
Figure 10:
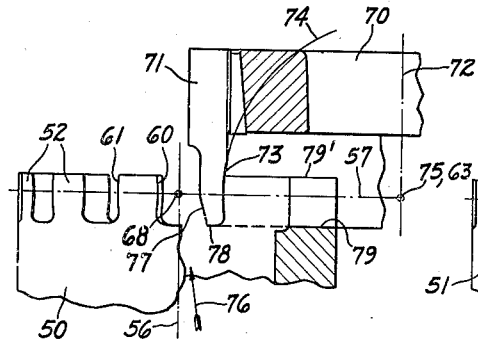
Figure 12:
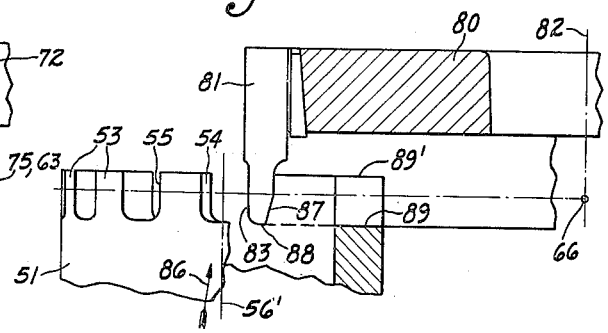
Figure 13:
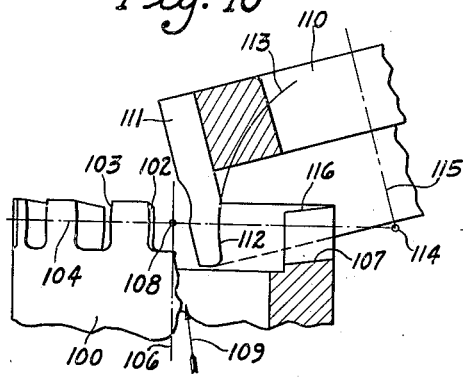
Figure 14:
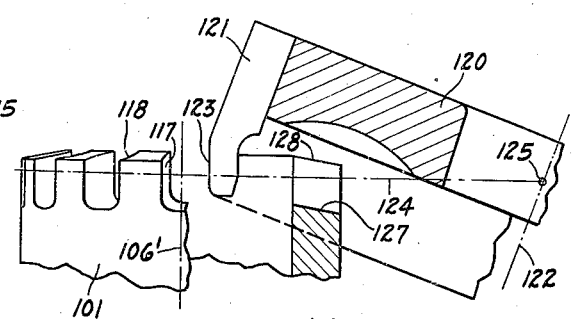

Figs. 6 to 8 inclusive are further views, taken 90° apart, showing other teeth and tooth spaces of the mating clutch members in engagement; Fig. 6 is a view taken 90° away from the view of Fig. 5; Fig. 7 is a view taken 90° away from the view of Fig. 6; and Fig. 8 is a view taken 90° away from Fig. 7, and therefore 90° away from Fig. 5;

Fig. 9 is a part transverse sectional, part plan view, and Fig. 10 is a part elevational, part axial sectional view illustrating diagrammatically one method of cutting one of two engaging clutch members constructed according to one embodiment of this invention;

Figs. 11 and 12 are corresponding views showing the cutting of the mating clutch member according to this invention;

Fig. 13 is a part elevation, part axial sectional view showing a different method, from that illustrated in Fig. 10, of cutting one member of a clutch pair according to this invention; and Fig. 14 is a part elevational, part axial sectional view, showing one method of cutting a clutch member to engage with the clutch member cut by the method of Fig. 13.

Figure 1:
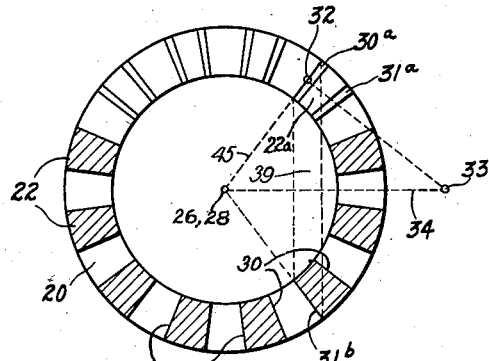
Fig. 1 is a part plan, part sectional view of a clutch member made according to one embodiment of this invention, the section being taken in a mean plane, such as the plane 1—1 of Fig. 2, hereinafter referred to as the pitch plane, which is perpendicular to the clutch axis.
Figure 2:
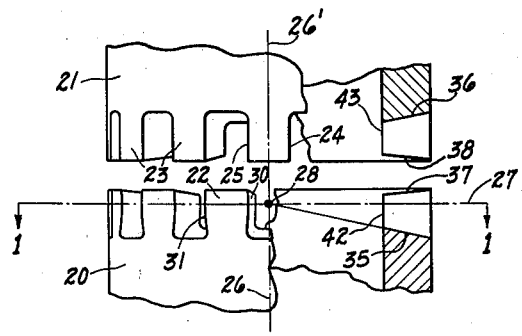
Fig. 2 is a part elevational, part axial sectional view of this clutch member and its mate in axial alignment, but disengaged.

In the embodiment of my invention illustrated in Figs. 1 and 2, the two engaging clutch members 20 and 21 have teeth 22 and 23, respectively, which extend radially of the axes of the clutch members and have tooth sides containing straight radially disposed line elements. The tooth sides 24 and 25 of the clutch member 21 are planes containing the axis 26' of the clutch member. Their profiles are straight and extend in the direction of the axis of the clutch member, that is, they are of zero pressure angle. The tooth sides 30 and 31 of the other clutch member 20 are of convex profile shape, but they are of zero pressure angle in the pitch plane 27 of this clutch member. This plane intersects the clutch axis at the point 28, hereinafter referred to as the pitch center. It is obvious that the convexly profiled tooth sides of the member 20 can rock on the plane tooth sides of the clutch member 21 and that this construction allows of considerable angular misalignment of the engaging clutch members while insuring that the clutch members will transmit proper motion between the parts which they connect.

The profiles of the clutch member 20 may be curved any desired amount. They are preferably made of circular arcuate shape, but may be also made of varying profile curvature. The profile shapes of the clutch member 20, of course, control the motion transmitted. With the axes of the two clutch members intersecting at an angle, the transmitted motion is the more uniform, the more curved the profiles of the tooth sides 30 and 31 are. Very good results are obtained when the radius of profile curvature of the tooth sides at a mean point in the tooth length is about equal to the radius of the clutch member at said mean point. Thus, the profile of the tooth side 30a at mean point 32 (Fig. 1) in the length of a tooth 22a of clutch member 20 is a circular arc centered at 33 and the profile radius 32—33 is about equal to the mean radius 28—32 of the clutch member. The profile radius is, however, always kept smaller than twice the mean clutch radius.

In use, the axes 26 and 26' of the engaging clutch members are centered at point 28, that is, they intersect at pitch center 28 if angularly disposed. The relative motion between the two clutch members and the required tooth structures are, therefore, problems of spherical trigonometry. The plane tooth sides of the member 21, which sweep the profile assumed at a mean point 32 of clutch member 20, also envelop the entire desired tooth surface of member 20. The tooth surface thus enveloped contacts the plane tooth sides of member 21 at any one moment along a straight line passing through the pitch center 28. The tooth surfaces of the member 20 are, therefore, composed of straight line elements all passing through pitch center 28, which is their apex. More broadly expressed, the tooth sides of the member 20 are parts of surfaces of revolution such as may be described about axes lying in the pitch plane and passing through the pitch center 28.

In the illustrated case, the tooth surfaces 30 and 31 of the clutch member 20 are parts of conical surfaces, the axis of the conical side tooth surface 30a lying, for instance, at 34 in the pitch plane 27 and connecting the points 28 and 33. Because of their conical formation, the tooth sides 30 and 31 are of varying profile curvature along their lengths but are of convex circular arcuate profile at any point along their lengths. Preferably the opposite sides of spaced teeth of the clutch member are made of parts of the same conical surface. Thus, the tooth surface 31b (Fig. 1), which is symmetrical to the tooth surface 30a, is also a convex conical surface, being part of the surface of the same cone 39 in which the tooth surface 30a lies, the axis of said cone being at 34. The straight line elements of this conical surface are denoted at 45.

In the embodiment of the invention shown in Figs. 1 and 2 the teeth taper in height from end to end, being of greatest height at their outer ends. Thus, the root lines 35 and 36 of the mating clutch members converge to the pitch center 28 when the clutch members are in engagement. The two clutch members 20 and 21 are also made with internally beveled top surfaces 37 and 38, respectively, which also converge to the pitch center 28 when the clutch members are in engagement.

When the two clutch members are engaged at an angle, contacting teeth and tooth spaces of the clutch members at different points 90° apart around the periphery of the clutch members will have positions such as shown in Figs. 5 to 8 inclusive. Fig. 5 is a view at right angles to the plane containing the axes of the two members. This view shows a tooth 22a of the clutch member 20 in tilted position in engagement with the tooth space 29a of the clutch member 21 which lies between the teeth 23a and 23b of that clutch member. Fig. 6 is a view at right angles to Fig. 5 and showing a tooth 22b of clutch member 20 engagement with a tooth space 29b of clutch member 21. Here the axis 26' of clutch member 21 lies in the plane of the drawing while the axis 26 of clutch member 20 is tilted upwardly from point 28 to its lower end. Fig. 7 is a view at right angles to Fig. 6 and 180° from the view of Fig. 5, and shows a tooth 22c of clutch member 20 in engagement in a tooth space 29c of clutch member 21. Fig. 8 is a view 90° from Fig. 7 and 270° from Fig. 5, and shows a tooth 22d of clutch member 20 in engagement in a tooth space 29d of clutch member 21.

The tilt of the two clutch members with reference to one another is made possible by the convex tooth profiles of opposite sides 30 and 31 of the teeth 22 of clutch member 20 and by provision of a slight amount of backlash between the two clutch members when their axes are aligned. It will be seen from Figs. 5 to 8 inclusive that when the two clutch members are in axial misalignment, the teeth 22 of the clutch member 20 enter to different depths into the tooth spaces of the clutch member 21 at different points around the periphery of the two clutch members. It will also be seen that with the axes of the two clutch members angularly disposed, the load is not carried equally on all the teeth of the clutch members. No load will be carried by the teeth 22b and 22d in the positions of Figs. 6 and 8 on account of the backlash between the members. The load is concentrated on the diametrically opposed teeth 22a and 22c and it is these teeth primarily which must keep the axes 26 and 26' of the two clutch members intersecting at pitch center 28.

I therefore preferably provide additional means for keeping the axes centered so that point 28 will be their common pitch center and they will continue to intersect in said pitch center when in operation. Such auxiliary means may comprise a ring-like centering member, such as denoted at 40 in Figs. 3 and 4. This centering member has a spherical outside surface 41 and when used with the clutch shown in Figs. 1 and 2, would be rigidly secured to the clutch member 20 and would be so ground that its outside spherical surface 41 would have its center coinciding with the pitch center 28 of clutch member 20. When used with clutch member 20, the spherical outside surface 41 of the centering member will contact with the inside cylindrical bores 42 and 43 of clutch members 20 and 21 and keep the axes 26 and 26' of the engaging clutch members intersecting, while permitting relative axial displacement of the two clutch members within predetermined limits. Spherical outside surface 41 of the ring member 40 and cylindrical inside surfaces 42 and 43 of the clutch members 20 and 21 may be ground.

The side tooth surface of the clutch member 21 can be produced by milling or planing or otherwise. For instance, a milling cutter of large diameter having side edges perpendicular to its axis may be positioned so as to cut radial lengthwise teeth on the blank and fed into depth until the tooth surfaces have been cut to full depth. Then the cutter is withdrawn from engagement with the blank and the blank indexed.

The tooth surfaces of the clutch member 20 may also be cut with a milling cutter or a planing tool or any other suitable tool. For instance, a tooth surface of this clutch member may be cut by a reciprocating planing tool by reciprocating the planing tool radially of the axis 26 of the clutch member while producing a relative depthwise feed movement between the planing tool and the clutch blank under control of a templet, having a shape corresponding to the profile shape to be produced on the blank. When a tooth surface has been cut to full depth, then the tool is withdrawn from engagement with the blanks and the blank indexed.

Figs. 9 to 12 inclusive show mating clutch members made according to a different embodiment of the invention and show methods of making these clutch members. Here the two engaging clutch members are denoted at 50 and 51, respectively. The clutch member 51 has, like the clutch member 21, side tooth surfaces 54 and 55 which are of straight profile and parallel to the axis 56' of the clutch member, that is, which are of zero pressure angle. The tooth sides 60 and 61 of the clutch member 50 are, also, like the tooth sides of the clutch member 20, of convex profile shape and of zero pressure angle in the pitch plane 57 of this clutch member. The tooth sides of the two clutch members 50 and 51 are, however, longitudinally curved. The sides 54 and 55 of clutch member 51 are longitudinally concave while the sides 60 and 61 of the clutch member 50 are of convex lengthwise tooth shape.

Preferably, opposite sides of spaced teeth of the clutch member 51 are made parts of a common surface of revolution. Thus, the opposite sides 55a and 54b (Fig. 11) of the teeth 53a and 53b, respectively, of clutch member 51 are portions of a common cylindrical surface 65 whose axis is at 66 parallel to the axis 56' of the clutch member.

Opposite sides of spaced teeth of clutch member 50, as, for instance, the opposite tooth sides 60a and 61b of the spaced teeth 52a and 52b extend along concentric circular arcs centered for instance at 63. Preferably, the opposite side surfaces of the teeth of the clutch member 50 are made spherical surfaces and opposite sides of spaced teeth are preferably made portions of the same convex spherical surface. Thus, the sides 60a and 61b of the spaced teeth 52a and 52b of clutch member 50 are portions of a single convex spherical surface whose center is at point 63 in pitch plane 57. Centers of spherical curvature of different pairs of tooth sides of the clutch member 50, then, will lie on a circle passing through point 63 concentric of the axis 56 of the clutch member.

A spherical surface so positioned can be described mathematically by rotation about an axis passing through point 63 and perpendicular to clutch axis 56 and located in the pitch plane 57. This axis lies in the line 56—63. Such a surface fulfills the kinematical requirement of profile curvature. In other words, by curving the pitch line lengthwise, the tooth sides can be made of constant profile curvature, equal to the sphere radius, all along their lengths without sacrifice of accuracy.

Form tools may be employed to cut the tooth surfaces of both clutch member 50 and clutch member 51. In cutting the clutch member 50, a face mill cutter 70 (Fig. 10) may be employed that has a plurality of cutting blades 71 arranged circularly about its axis 72 and having cutting portions projecting beyond one side face of the cutter in the general direction of the axis of the cutter. The blades 71 are sharpened to have inside cutting edges 73 of circular arcuate profile shape which together constitute a spherical cutting surface 74 centered at point 75 on the cutter axis. The cutter is positioned so that its axis 72 is parallel to the axis 56 of the clutch member and passes through the point 63. As the cutter is rotated on its axis 72, then, its inside cutting edges will move in a circular path, corresponding to the path 64, across the face of the work and sweep out the desired spherical tooth surfaces on the work.

In the cutting operation, the cutter is rotated in engagement with the work, while the work is held stationary on its axis and while simultaneously a relative depthwise feed movement is effected between the cutter and the work to cut the tooth surfaces of the work to full depth. Preferably, this feed movement is imparted to the work and is effected in a direction inclined to the work axis, as in the direction denoted by the arrow 76. After full depth position has been reached, the feed is reversed and the cutter is withdrawn at a fast rate from the blank. When the cutter is clear of the blank, the work is indexed. In-feed is then again started to begin a new cutting cycle.

The mating clutch member 51 may be produced with a face mill cutter 80 (Fig. 12) whose cutting blades 81 are arranged circularly about its axis 82 and have their cutting portions projecting beyond one side face of the cutter in the general direction of the axis of the cutter. The blades 81 are provided with outside cutting edges 83 which are of straight profile and parallel to the axis 82 of the cutter, that is, of zero pressure angle. Thus, as the cutter 80 is rotated on its axis, its outside cutting edges sweep out a cylindrical surface corresponding to the surface 65. In the cutting operation, the cutter is rotated on its axis in engagement with the work, while the work is held stationary and while simultaneously a relative depthwise feed movement is produced between the cutter and the work preferably in a direction inclined to the work axis, as in the direction denoted by the arrow 86. Tooth surfaces are therefore cut on the clutch member 51 which are cylindrical surfaces parallel to the axis 56' of the clutch member. When a tooth surface has been cut to full depth, the cutter is withdrawn rapidly from engagement with the work, and when the cutter is clear of the work, the work is indexed. Then the cutter is again fed into the work to begin a new cutting cycle.

Because the direction 76 of feed is inclined to the axes 56 and 72, respectively of the work and cutter in the cutting of the clutch member 50, the cutting of the tooth surfaces of this clutch member is done with the inside cutting edges 73 and top cutting edges 78 exclusively, even when cutting from the solid. Hence, the cutter 70 can be sharpened so that all of its side-cutting edges are inside cutting edges. Likewise, because the direction 86 of depthwise feed is inclined to the axes 56' and 82 of work and cutter, respectively, in the cutting of the clutch member 51, cutting of the tooth spaces of this clutch member is done by the outside cutting edges 83 and tip-cutting edges 88 of this cutter exclusively. Thus, this cutter may be sharpened to have side cutting edges lying at its outside only.

Since the axis 72 of cutter 70 is parallel to the axis 56 of the work in the cutting of the clutch member 50, the root line 79 of this clutch member will be perpendicular to the clutch axis 56. By making the top surface 79' of the clutch member a plane, then, perpendicular to the clutch axis 56, teeth of uniform depth from end to end may be obtained. In similar manner, teeth of uniform depth may be obtained on the mating clutch member 51, for with the described method of cutting this clutch member, its root line 89 will be perpendicular to the clutch axis 56', and the top surface of the clutch member 89' may be made a plane surface perpendicular to the clutch axis.

Figure 4:
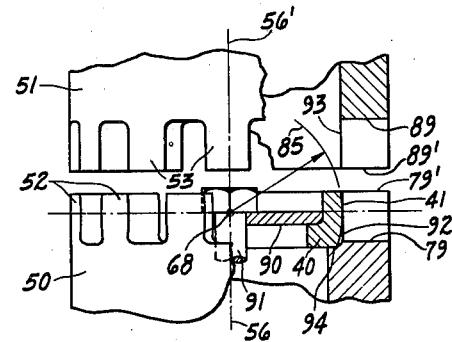
Fig. 4 is a view similar to Fig. 2 but showing clutch members made according to a still further embodiment of the invention.

The two clutch members 50 and 51 are shown disengaged, but in axially aligned position in Fig. 4. To keep the axes 56 and 56' of the clutch members intersecting at pitch center 68 when the axes are angularly disposed to one another and the two members are revolving together, a centering ring 40, such as previously described, may be employed. The outside surface 41 of this centering ring is then ground as a spherical surface 85 whose center is at point 68. This centering ring is rigidly secured to the clutch member 50 by a clamping disc or washer 90 and a bolt 91. The spherical outside surface 41 of the centering mem- Instead of being engaged with clutch member 51, clutch member 50 may be paired with clutch member 101, or clutch member 100 may be paired with clutch member 51. Moreover, two clutch members like clutch member 50 or like clutch members 100, may be used together. Other pairings are also possible, as will be obvious.

Instead of using face-mill cutters to cut the clutch members 50, 51, 100, or 101, annular grinding wheels or oscillatory cup-shaped grinding wheels may be employed to grind the tooth surfaces of these members. The grinding wheels will be dressed to have spherical inside cutting surfaces or straight profiled outside cutting surfaces depending upon whether clutch members like the clutch member 100 or clutch members like the clutch member 101 are to be ground. In any case, the grinding wheel will be so positioned with reference to the work as to produce the desired tooth surfaces on the work. An annular grinding wheel can produce the desired tooth surfaces simply by rotation on its axis and depthwise feed into the work. A cup-shaped grinding wheel is rotated on its axis and simultaneously oscillated to trace the desired lengthwise tooth shape, and is fed depthwise to produce the tooth surfaces for their full height.

Face clutches are much better adapted for use as semi-universal clutches than are clutches comprising external and internal gear members. The convex tooth profiles required on one clutch member are in the direction of the tooth height in the case of a face clutch and can be curved as much as required without restriction. Tooth strength may be increased simply by lengthening the teeth of the clutch member. On external and internal clutches, however, the convex profiles required for misalignment must extend in the direction of the tooth length and there are, therefore, very definite limitations as to curvature. Moreover, hardly any strength may be gained by increasing the face length. Face clutches of the type herein described lend themselves to symmetrical light weight design and they can be produced at low cost in very efficient cutting or grinding operations.

While several different embodiments of the invention have been described, it will be understood that it is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A toothed face clutch member, opposite side tooth surfaces of which are parts of surfaces of revolution whose axes lie in the pitch plane of the clutch member and are perpendicular to the clutch axis.

2. A toothed face clutch member, having side tooth surfaces of convex profile lying in surfaces of revolution such as may be described about axes substantially perpendicular to and intersecting the clutch axis at a point axially in line with the teeth, the axis of a tooth side being disposed at a larger distance from said tooth side than the center line of the tooth of which said tooth side is a part.

3. A pair of toothed face clutch members, one of which has tooth sides of straight profile and zero pressure angle and the other of which has tooth sides of convex profile that are of zero pressure angle in the pitch plane of the clutch member.

4. A toothed face clutch member whose opposite tooth sides are of convex profile and of zero pressure angle in the pitch plane of the clutch member.

5. A pair of toothed face clutch members, each of which has teeth extending generally radially of the clutch axis, the sides of said teeth having line elements which converge in a common point lying on the clutch axis, and one of which, at least, has side tooth surfaces of convex profile.

6. A toothed face clutch member having teeth extending radially of its axis whose side surfaces are conical and of convex profile shape.

7. A pair of toothed face clutch members, both of which have longitudinally straight sided teeth, one of which has plane tooth sides and the other of which has conical tooth sides of convex profile shape.

8. A toothed face clutch member having teeth extending in a direction generally radial of the clutch axis whose opposite side tooth surfaces are parts of surfaces of revolution and of convex profile shape.

9. A toothed face clutch member having teeth extending in a direction generally radial of the clutch axis, each of whose sides is of convex circular arcuate profile shape, the radius of profile curvature being less than the clutch diameter.

10. A toothed face clutch member whose opposite tooth sides are of convex profile shape and convex lengthwise shape.

11. A toothed face clutch member whose opposite sides are of convex profile shape and convex lengthwise shape, opposite sides of spaced teeth being parts of a common surface of revolution.

12. A toothed face clutch member whose opposite tooth sides are of convex profile shape and convex lengthwise shape, opposite sides of spaced teeth being parts of a common convex spherical surface.

13. A toothed face clutch member whose opposite tooth sides are of convex profile shape and longitudinally curved and of zero pressure angle at an intermediate point in the tooth height.

14. A toothed face clutch member having tooth sides of convex profile, opposite sides of spaced teeth lying in a common surface of revolution such as may be described about an axis substantially perpendicular to and intersecting the clutch axis, the largest normal radius of said surface of revolution being smaller than the outside diameter of said clutch member.

15. A pair of toothed face clutch members, both of which have teeth that extend generally radially of the clutch axis, opposite sides of the teeth of both members being longitudinally curved, the tooth sides of one member being of straight profile substantially parallel to the clutch axis, and the tooth sides of the other member being of convex profile and of zero pressure angle in the pitch plane of said member.

16. A pair of toothed face clutch members, both of which have teeth that extend generally radial of the clutch axis, opposite sides of spaced teeth of one member being parts of a common cylindrical surface parallel to the axis of said member, and opposite sides of spaced teeth of the other member being parts of a common spherical ber 40 then contacts with the cylindrical surfaces 92 and 93 formed at the inner ends of teeth 52 and 53, respectively, of the clutch members 50 and 51, respectively, by the bores in these clutch members. Thus the axes 56 and 56' will continue to intersect at pitch center 68 despite axial misalignment of the axes. Spherical surface 41 and cylindrical surfaces 92 and 93 as well as the seat 94, formed in the clutch member 54 for the centering ring 40, may be ground.

Full contact between the engaging side surfaces 54 and 60 and 55 and 61 of the clutch members 50 and 51 may be obtained by using a cutter 80 to cut the clutch member 51 whose outside cutting radius is equal to the sphere radius of the inside cutting surface of the cutter 70 which cuts the clutch member 50. In this case, the two tooth zones in which the cutter 80 operates will be spaced apart one tooth less than shown in Fig. 11. It is ordinarily preferable, however, to have the mating tooth surfaces contact with less than full length bearing and to have an easing off of the tooth bearing at the tooth ends. This can be accomplished by using cutters of the relative diameters of the cutters 70 and 80 shown in Figs. 9 to 12 inclusive. Here the cutter 80 traces a cylindrical cutting surface 65 of larger diameter than the spherical surface 64 traced by the inside cutting edges of the cutter 70.

Face mill cutter blades that have side-cutting edges of zero pressure angle have to be relieved both radially and axially in order to secure proper cutting clearance behind the side-cutting edges. After sharpening, such blades have to be adjusted radially of the cutter axis to enable them to cut a surface of the same radius as when new. This radial adjustment of the cutter blades is inconvenient and time-consuming. Hence, it is usually preferred to make face mill cutters with side-cutting edges of positive pressure angle. The blades of cutters of positive pressure angle, may be relieved axially. These cutters will maintain their diameters, despite sharpening, and no radial adjustment of their blades is required after sharpening. The cutter can be adjusted bodily axially after sharpening and all blades can with this single axial adjustment be moved into the same cutting positions as when new.

Figs. 13 and 14 show a pair of toothed face clutch members cut according to a further embodiment of this invention with face mill cutters having finish side-cutting edges of positive pressure angle. The clutch member 100, like the clutch member 50 previously described, has side tooth surfaces 102 and 103 of convex profile shape and of convex lengthwise shape. These tooth surfaces are of zero pressure angle in the pitch plane 104 of the clutch member. They are, also, portions of spherical surfaces centered in the pitch plane 104. Opposed sides 102 and 103 of spaced teeth of the clutch member again are portions of a common spherical surface. A face mill cutter 110 is used, however, in the production of the clutch member 100 which has blades 111 whose inside cutting edges 112 are of positive pressure angle or inclination to the cutter axis 115. The inside cutting edges 112 are circular arcs centered at 114 on the cutter axis 115. The cutter 110 is positioned so that its axis 115 is inclined to the axis 106 of the work at an angle such that the cutter will produce tooth surfaces on the work of zero pressure angle in the pitch plane 104. The cutter 110 may, therefore, produce the same spherical side tooth surfaces on the clutch member 100 as the cutter 70 produces on the clutch member 50.

Cutting of the clutch member 100 is effected by rotating the cutter 110 on its axis 115 while holding the work stationary and while effecting a relative depthwise feed movement between the cutter and the work preferably in a direction 109 inclined to the axis of the work. When two opposite side surfaces of spaced teeth of the work have been cut to full depth, the cutter is withdrawn from engagement with the work, and the work is indexed. Then the cycle begins anew.

Due to the outward tilt of the cutter, the root lines 107 of the tooth spaces of the clutch member 100 are inclined to the axis 106 of the clutch member at other than a right angle and the root surface 107 is higher at the outer ends of the tooth spaces than at the inside ends thereof. In order to maintain the height of the teeth uniform from end to end, the top surface 116 of the clutch member is also preferably internally beveled, as shown.

The mating clutch member 101 has, like the clutch member 51, side tooth surfaces 117 and 118 of straight profile and of zero pressure angle, and these side tooth surfaces are longitudinally concave as are the side tooth surfaces of clutch member 51. Further, opposite sides of spaced teeth of clutch member 101 are preferably made portions of a common concave conical surface whose axis is at 122 inclined to the clutch axis 106'.

The tooth surfaces of clutch member 101 can be cut with a face mill cutter 120 that is provided with a plurality of cutting blades 121 having outside cutting edges 123 of straight profile inclined to the axis 122 of the cutter at a positive pressure angle. The outside cutting edges of this cutter constitute, therefore, a conical cutting surface co-axial with the cutter axis 122. In cutting the tooth surfaces of the clutch member 101, the cutter 120 is tilted inwardly so that tooth surfaces of the desired zero pressure angle may be produced on the work. The axis 122 of the cutter then intersects the pitch plane 124 of the work in a point 125 which corresponds to the point 66 of Fig. 11. Cutting is effected by rotating the cutter 120 on its axis while holding the work stationary and effecting a relative feed movement between the cutter and work again preferably in a direction inclined to the axis of the work. When two opposite sides of spaced teeth of the work have been cut, the cutter is withdrawn from engagement with the work, and the work indexed. Then the cycle begins anew.

Due to the inward tilt of the cutter 120, the root lines 127 of the tooth spaces of the clutch member 101 will be inclined at other than a right angle to the axis 106' of the clutch member and be lower at the outer ends of the teeth than at the inner ends thereof. To obtain uniform tooth depth, therefore, the top surface 128 of the clutch member is preferably turned as a conical surface substantially parallel to the root surface 127.

Figure 3:
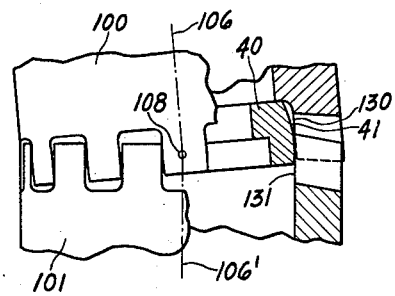
Fig. 3 is a part elevational, part axial sectional view of two clutch members made according to a somewhat different embodiment of this invention, showing the clutch members in engagement but in axial misalignment.

Fig. 3 shows the clutch members 100 and 101 in engagement with their axes 106 and 106' inclined to one another. Here, again, a centering ring 40 may be employed to maintain the axes intersecting as the clutch members revolve together. The spherical surface 41 of the centering member is ground to coincide with the pitch center 108 of clutch member 100 and it bears against the cylindrical surfaces 130 and 131 formed at the inner ends of the teeth of the clutch members 100 and 101, respectively.

surface whose center lies in the pitch plane of said member.

17. A pair of toothed face clutch members whose axes intersect in a point lying in the pitch plane of one of the members, said members having teeth extending generally radially of their axes, the inner ends of the teeth of each member constituting parts of a cylindrical surface coaxial with said member, one of said members having a centering ring secured thereto, said centering ring having an external spherical surface which bears against the cylindrical surfaces constituted by the tooth ends and whose center coincides with the point of intersection of said axes.

18. A toothed face clutch member having tooth sides of convex profile shape and zero pressure angle in a plane perpendicular to the clutch axis and intermediate the tooth height, and a spherical centering member secured to said clutch member and having a spherical centering surface, the center of said spherical surface being in said plane.

19. A toothed face clutch member having tooth sides of convex profile shape lying in surfaces of revolution of straight profile, the axes of said surfaces being substantially perpendicular to and intersecting the clutch axis at a point axially in line with the teeth.

20. A toothed face clutch member having the opposite sides of spaced teeth lying in a common convex conical surface whose axis is substantially perpendicular to and intersects the clutch axis.

21. A toothed face clutch member having radially arranged teeth whose sides lie in convex spherical surfaces, the centers of the spherical surfaces of both sides of the teeth lying in the same plane perpendicular to the clutch axis and at a larger distance from said axis than the clutch teeth.

22. A pair of toothed face clutch members, each of which has longitudinally straight sided tooth surfaces extending radially of its axis, one of which has plane tooth sides of zero pressure angle, and the other of which has conical tooth sides of convex profile shape, the axes of which are perpendicular to the axis of the clutch and which are of zero pressure angle in the pitch plane of the clutch member.

23. A pair of toothed face clutch members, each of which has teeth that extend generally radially of the clutch axis, opposite sides of the teeth of one member being parts of surfaces of revolution of straight profile and zero pressure angle and opposite sides of the teeth of the other member being parts of surfaces of revolution of convex profile shape and zero pressure angle at the pitch line of said member.

24. A pair of toothed face clutch members, one of which has opposite side tooth surfaces of concave lengthwise shape and straight profile shape, and the other of which has opposite side tooth surfaces of convex profile shape and convex lengthwise shape.

25. A pair of toothed face clutch members, one of which has opposite side tooth surfaces of concave lengthwise shape and straight profile shape, the other of which has opposite side tooth surfaces of convex profile shape and convex lengthwise shape, opposite sides of spaced teeth of each member being portions of a common surface of revolution.

26. A pair of toothed face clutch members, one of which has opposite side tooth surfaces of concave lengthwise shape and straight profile shape, and the other of which has opposite side tooth surfaces of convex profile shape and convex lengthwise shape, opposite sides of spaced teeth of each member being portions of a common surface of revolution, and opposite sides of the teeth of both members being of zero pressure angle at the pitch lines of said members.

27. A pair of toothed face clutch members, each of which has generally radial teeth, one of which has opposite side tooth surfaces of convex circular arcuate profile shape, and the other of which has opposite side tooth surfaces of straight profile shape and zero pressure angle.

ERNEST WILDHABER.